(12) United States Patent
Patterson et al.

(10) Patent No.: US 11,718,384 B2
(45) Date of Patent: Aug. 8, 2023

(54) HAT-STRINGER ASSEMBLIES FOR AN AIRCRAFT AND METHODS OF FORMING SAME

(71) Applicant: The Boeing Company, Chicago, IL (US)

(72) Inventors: Steve L. Patterson, Glen Mills, PA (US); Daniel M. Levine, Seattle, WA (US); Jeffrey E. Barnes, Shoreline, WA (US); Jeffrey F. Stulc, Stanwood, WA (US); Christopher R. Loesche, Bothell, WA (US); Garrett C. Hanson, Everett, WA (US)

(73) Assignee: The Boeing Company, Chicago, IL (US)

(*) Notice: Subject to any disclaimer, the term of this patent is extended or adjusted under 35 U.S.C. 154(b) by 69 days.

(21) Appl. No.: 17/390,244

(22) Filed: Jul. 30, 2021

(65) Prior Publication Data

US 2023/0031639 A1 Feb. 2, 2023

(51) Int. Cl.
  *B64C 1/00* (2006.01)
  *B64C 3/18* (2006.01)
  *B64C 1/06* (2006.01)

(52) U.S. Cl.
  CPC .............. *B64C 3/182* (2013.01); *B64C 1/064* (2013.01)

(58) Field of Classification Search
  None
  See application file for complete search history.

(56) References Cited

U.S. PATENT DOCUMENTS

| | | | |
|---|---|---|---|
| 8,763,253 B2 | 7/2014 | Kamaraj et al. | |
| 9,399,509 B2 | 7/2016 | Rolfes | |
| 2010/0304094 A1 | 12/2010 | Brook et al. | |
| 2012/0261057 A1 | 10/2012 | Bergmann et al. | |
| 2016/0052617 A1 | 2/2016 | Rolfes et al. | |
| 2016/0368617 A1 | 12/2016 | Best, III | |
| 2019/0270508 A1 | 9/2019 | Cass et al. | |
| 2020/0010176 A1* | 1/2020 | Douglas | B64C 3/182 |
| 2020/0231267 A1 | 7/2020 | Rotter et al. | |

FOREIGN PATENT DOCUMENTS

| | | |
|---|---|---|
| EP | 3590825 A1 | 1/2020 |
| WO | 2012101439 A1 | 8/2012 |

* cited by examiner

*Primary Examiner* — Alexander S Thomas
(74) *Attorney, Agent, or Firm* — Quinn IP Law

(57) ABSTRACT

A hat-stringer assembly for an aircraft comprises a hat stringer with a first hat-stringer leg, a second hat-stringer leg, a first hat-stringer sidewall, a connecting wall, a second hat-stringer sidewall, and a ventilation opening, extending through the connecting wall. The hat stringer assembly also comprises a fitting, comprising a first channel member in contact with the first hat-stringer sidewall and the first hat-stringer leg. The fitting also comprises a second channel member in contact with the second hat-stringer sidewall and the second hat-stringer leg. The fitting further comprises a web cap, in contact with the first channel member and the second channel member. The web cap comprises a web-cap opening, which is in fluidic communication with the ventilation opening.

20 Claims, 12 Drawing Sheets

HAT-STRINGER ASSEMBLIES FOR AN AIRCRAFT AND METHODS OF FORMING SAME

TECHNICAL FIELD

Described herein are hat-stringer assemblies for aircraft and methods for forming hat-stringer assemblies.

BACKGROUND

Structures, such as aircraft fuel tanks, can be stiffened with hat stringers. Fuel tanks are conventionally vented via the hat stringers. Fittings are provided between at least some of the hat stringers and corresponding valves to support the valves and to direct air flow from the hat stringers to the fuel tank. Typically, the fittings and valves are assembled onto completed hat stringers. Fit-up and attachment of the fittings and valves to the hat stringers requires additional assembly time for fastening, drilling, shimming, and/or sealing. Still further, the use of fasteners and shims for attaching components to the hat stringers adds weight to the aircraft assembly.

SUMMARY

Accordingly, apparatuses and methods, intended to address at least the above-identified concerns, would find utility.

The following is a non-exhaustive list of examples of the subject matter, disclosed herein.

Disclosed herein is a hat-stringer assembly for an aircraft. The hat stringer assembly comprises a hat stringer with a first hat-stringer leg that comprises a first-hat-stringer-leg surface. The hat stringer also comprises a second hat-stringer leg that comprises a second-hat-stringer-leg surface. The second hat-stringer leg is spaced apart from the first hat-stringer leg. The hat stringer further comprises a first hat-stringer sidewall, comprising a first-hat-stringer-sidewall surface, extending from the first-hat-stringer-leg surface. Still further, the hat stringer comprises a connecting wall, extending from the first hat-stringer sidewall and having a virtual connecting-wall symmetry plane, passing through the connecting wall. The hat stringer also comprises a second hat-stringer sidewall, comprising a second-hat-stringer sidewall surface, extending from the connecting wall to the second-hat-stringer-leg surface. The hat stringer further comprises a ventilation opening, extending through the connecting wall. The hat stringer assembly also comprises a fitting, coupled to the hat stringer. The fitting comprises a first channel member, comprising a first-channel-member sidewall, in contact with the first hat-stringer sidewall. The first channel member also comprises a first-channel-member base leg, extending from the first-channel-member sidewall and in contact with the first hat-stringer leg. The first channel member additionally comprises a first-channel-member cap leg, extending from the first-channel-member sidewall. The fitting also comprises a second channel member, comprising a second-channel-member sidewall, in contact with the second hat-stringer sidewall. The second channel member also comprises a second-channel-member base leg, extending from the second-channel-member sidewall and in contact with the second hat-stringer leg. The second channel member additionally comprises a second-channel-member cap leg, extending from the second-channel-member sidewall. The fitting further comprises a web cap, in contact with the first-channel-member cap leg and the second-channel-member cap leg. The web cap comprises a web-cap opening, which is in fluidic communication with the ventilation opening.

Providing the hat-stringer assembly comprising both the hat stringer and the fitting eliminates the need to assemble a separate fitting onto an existing hat stringer, which would require the separate fitting to be positioned on the stringer, adjusted and or shimmed relative to the stringer, fastened in place, and sealed to the stringer. Additionally, the fitting is configured to strengthen a portion of the hat stringer near the ventilation opening, thereby increasing local stiffness of the hat stringer while reducing weight.

Also disclosed herein is a method of forming the hat-stringer assembly. The method comprises forming the hat stringer from a first plurality of plies of composite material. The method also comprises forming the fitting from a second plurality of plies of composite material and joining the hat stringer and the fitting together.

Forming the hat stringer from a first plurality of plies of composite material and forming the fitting from a second plurality of plies of composite material enables fabrication of both components using the same manufacturing techniques, thereby reducing fabrication time and expense. Joining the hat stringer and the fitting, such as by co-curing or co-bonding, results in the hat-stringer assembly having improved integrity and rigidity, while reducing overall weight associated with fastening separate components together and/or associated with heavier materials used in conventional fittings.

Also disclosed herein is an aircraft, comprising a skin portion that has an inner side. The aircraft also comprises the hat-stringer assembly, coupled to the inner side of the skin portion.

The hat-stringer assembly provides advantages when used on an aircraft. The hat stringer reinforces the skin portion of the aircraft, allowing the skin portion to be made from a thinner material and reducing overall weight of the aircraft.

BRIEF DESCRIPTION OF THE DRAWINGS

Reference will now be made to the accompanying drawings, which are not necessarily drawn to scale, and where like reference characters designate the same or similar parts throughout the several views. In the drawings.

DETAILED DESCRIPTION

Figure 1:
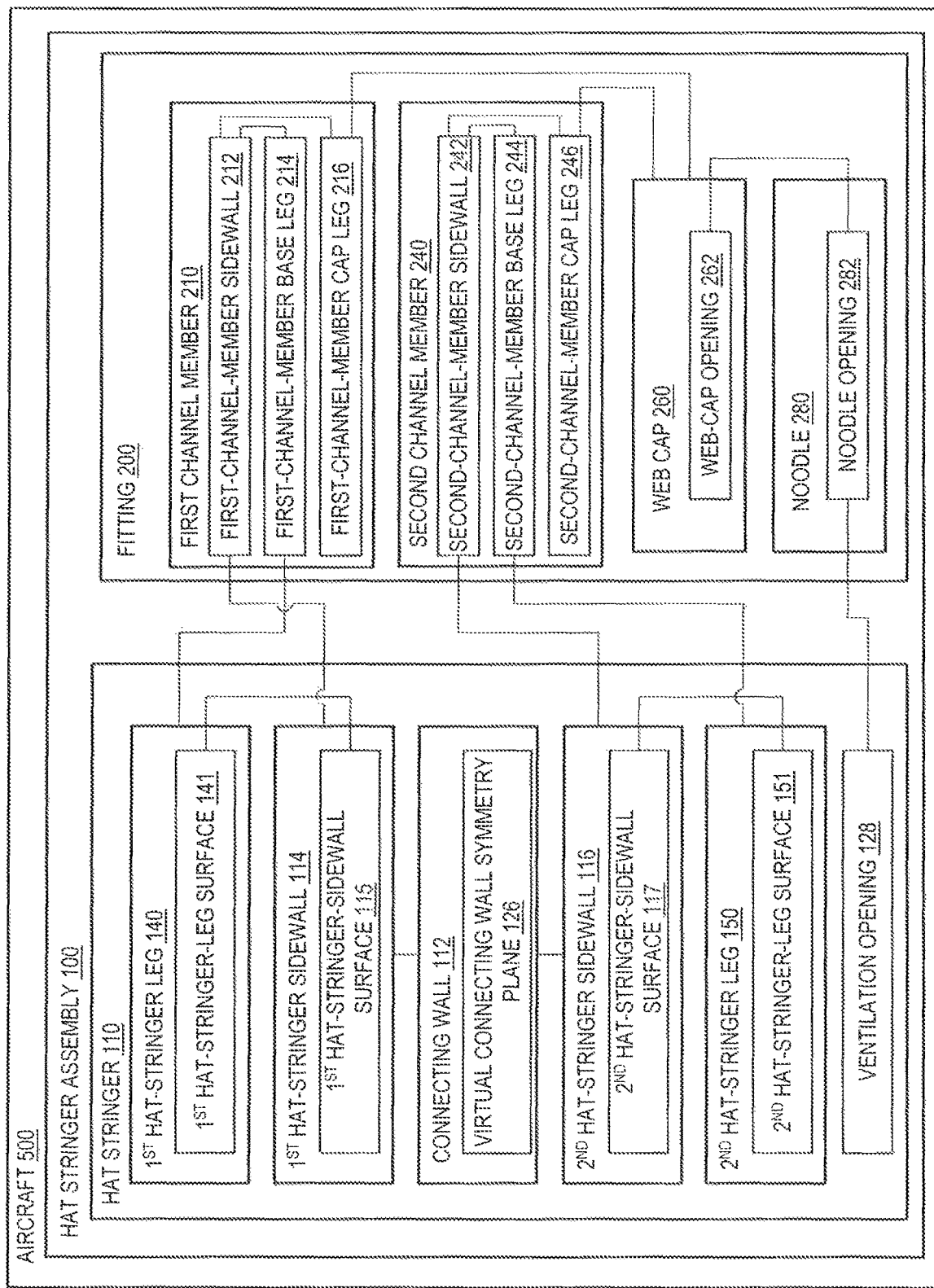
FIG. 1 is a block diagram of an aircraft having a hat stringer assembly, according to one or more examples of the subject matter, disclosed herein.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

Figure 12:
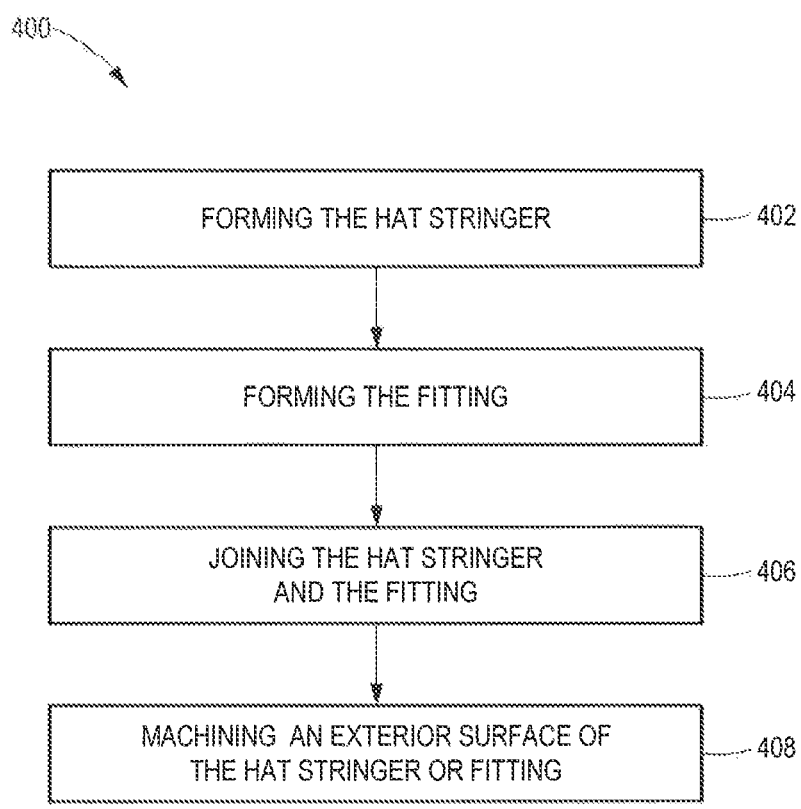
FIG. 12 is a block diagram of a method, according to one or more examples of the subject matter, disclosed herein, of forming the hat stringer assembly of FIG. 1, according to one or more examples of the subject matter, disclosed herein.
Figure 13:
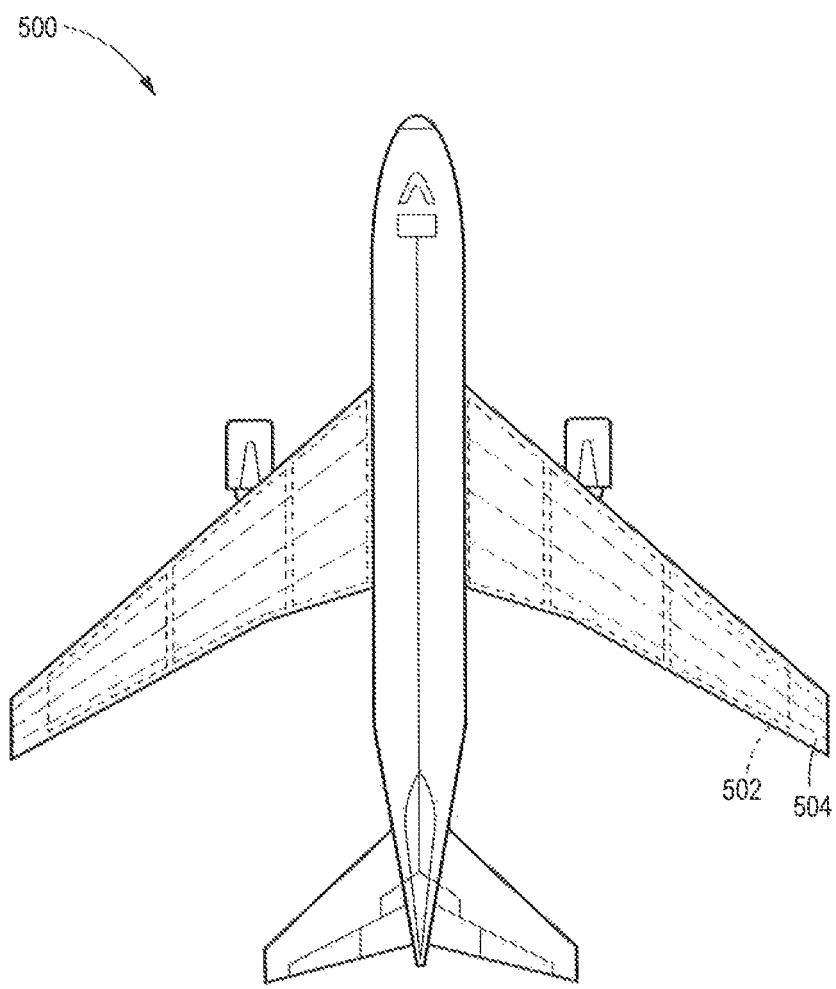
FIG. 13 is a schematic, top view of an aircraft having a hat stringer assembly of FIG. 1, according to one or more examples of the subject matter, disclosed herein.

In FIG. 12, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 12 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples of the subject matter, disclosed herein, are provided below.

Referring generally to FIG. 1 and particularly to, e.g., FIGS. 2-6 for illustrative purposes only and not by way of limitation, the following portion of this paragraph delineates example 1 of the subject matter, disclosed herein. According to example 1, hat-stringer assembly 100, provided for aircraft 500, comprises hat stringer 110, which comprises first hat-stringer leg 140 that comprises first-hat-stringer-leg surface 141. Hat stringer 110 also comprises second hat-stringer leg 150 that comprises second-hat-stringer-leg surface 151. Second hat-stringer leg 150 is spaced apart from first hat-stringer leg 140. Hat stringer 110 further comprises first hat-stringer sidewall 114, comprising first-hat-stringer-sidewall surface 115, extending from first-hat-stringer-leg surface 141. Still further, hat stringer 110 comprises connecting wall 112, extending from first hat-stringer sidewall 114 and having virtual connecting-wall symmetry plane 126, passing through connecting wall 112. Hat stringer 110 also comprises second hat-stringer sidewall 116, comprising second-hat-stringer sidewall surface 117 that extends from connecting wall 112 to second-hat-stringer-leg surface 151. Hat stringer 110 further comprises ventilation opening 128, extending through connecting wall 112. Hat-stringer assembly 100 also comprises fitting 200, coupled to hat stringer 110. Fitting 200 comprises first channel member 210, comprising first-channel-member sidewall 212, which is in contact with first hat-stringer sidewall 114. First channel member 210 also comprises first-channel-member base leg 214, extending from first-channel-member sidewall 212 and in contact with first hat-stringer leg 140. First channel member 210 additionally comprises first-channel-member cap leg 216, extending from first-channel-member sidewall 212. Fitting 200 also comprises second channel member 240, comprising second-channel-member sidewall 242, which is in contact with second hat-stringer sidewall 116. Second channel member 240 also comprises second-channel-member base leg 244, extending from second-channel-member sidewall 242 and in contact with second hat-stringer leg 150. Second channel member 240 additionally comprises second-channel-member cap leg 246, extending from second-channel-member sidewall 242. Fitting 200 further comprises web cap 260, in contact with first-channel-member cap leg 216 and second-channel-member cap leg 246. Web cap 260 comprises web-cap opening 262, which is in fluidic communication with ventilation opening 128.

Providing hat-stringer assembly 100 that comprises both hat stringer 110 and fitting 200 eliminates the need to assemble a separate fitting onto an existing hat stringer, which would require the separate fitting to be positioned on the stringer, adjusted and or shimmed relative to the stringer, fastened to the stringer, and sealed to the stringer. Additionally, fitting 200 is configured to strengthen a portion of hat stringer 110 near ventilation opening 128, thereby increasing local stiffness of hat stringer 110 while reducing weight. Fitting 200 comprises first channel member 210 and second channel member 240 having portions that are in contact with hat stringer 110, thereby to reinforce hat stringer 110. Specifically, first channel member 210 has first-channel-member sidewall 212, in contact with first hat-stringer sidewall 114, and first-channel-member base leg 214, extending from first-channel-member sidewall 212 and in contact with first hat-stringer leg 140. Second channel member 240 comprises second-channel-member sidewall 242, in contact with second hat-stringer sidewall 116, and second-channel-member base leg 244, extending from second-channel-member sidewall 242 and in contact with second hat-stringer leg 150. Additionally, first channel member 210 comprises first-channel-member cap leg 216, extending from first-channel-member sidewall 212, while second channel member 240 comprises second-channel-member cap leg 246, extending from second-channel-member sidewall 242. Web cap 260 is in contact with first-channel-member cap leg 216 and second-channel-member cap leg 246 to provide additional reinforcement to the stringer near ventilation opening 128, while providing a structure for receiving and supporting ancillary components, such as a vent valve.

As used herein, "virtual" means having the attributes of an entity without possessing its physical form. For example, a virtual reference plane is an intangible or imaginary plane, rather than a physical one, with respect to which, e.g., location and/or orientation of other physical and/or intangible entities is defined. Virtual connecting-wall symmetry plane 126 is a plane that passes through connecting wall 112 and that divides connecting wall 112 into two identical halves.

As used herein, "fluidic" means of or pertaining to a fluid. Accordingly, the phrase "in fluidic communication" means fluid is capable of communicating, or flowing, between identified structures or components. Web-cap opening 262 in fluidic communication with ventilation opening 128 means fluid is capable of flowing between web-cap opening 262 and ventilation opening 128.

Providing hat-stringer assembly 100 with fitting 200 in contact with hat stringer 110 simplifies attachment of ancillary components while reducing weight. In one or more examples, hat stringer 110 and fitting 200 are formed of plies of composite material that are joined together, such as by co-curing or co-bonding, thereby providing a monolithic structure, having improved stiffness and rigidity.

Referring generally to FIG. 1 and particularly to, e.g., FIGS. 2-6 for illustrative purposes only and not by way of limitation, the following portion of this paragraph delineates example 2 of the subject matter, disclosed herein. According to example 2, which encompasses example 1, above, first-hat-stringer-leg surface 141 is planar, second-hat-stringer-leg surface 151 is planar, and first-hat-stringer-leg surface 141 and second-hat-stringer-leg surface 151 are co-planar. Additionally, first-hat-stringer-sidewall surface 115 is planar. Furthermore, first-hat-stringer-sidewall surface 115 is oblique to or perpendicular to first-hat-stringer-leg surface 141, connecting wall 112 is arcuate, and virtual connecting-wall symmetry plane 126 is perpendicular to first-hat-stringer-leg surface 141 and second-hat-stringer-leg surface 151. Second-hat-stringer-sidewall surface 117 is planar. Furthermore, second-hat-stringer-sidewall surface 117 is oblique to or perpendicular to second-hat-stringer-leg surface 151.

Figure 5:
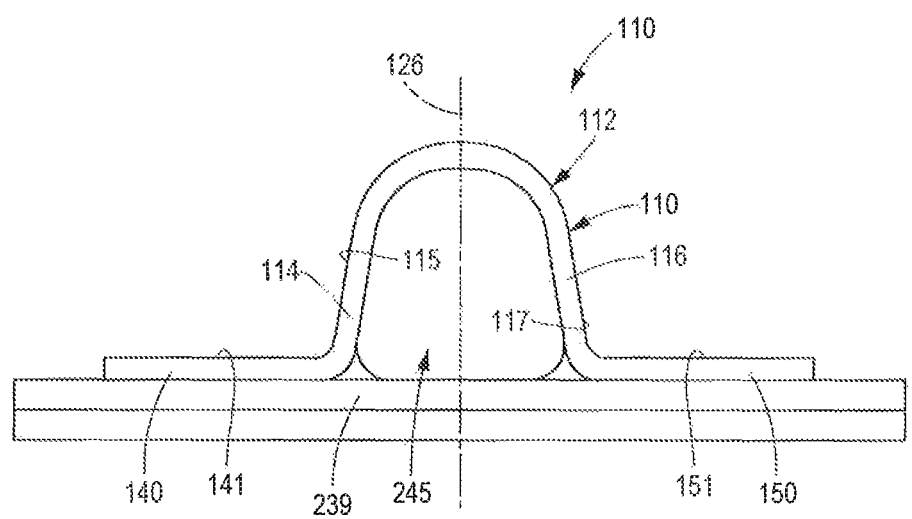
FIG. 5 is a schematic, elevation view of the hat stringer of FIG. 4, including a hat-stringer base wall, according to one or more examples of the subject matter, disclosed herein.
Figure 6:
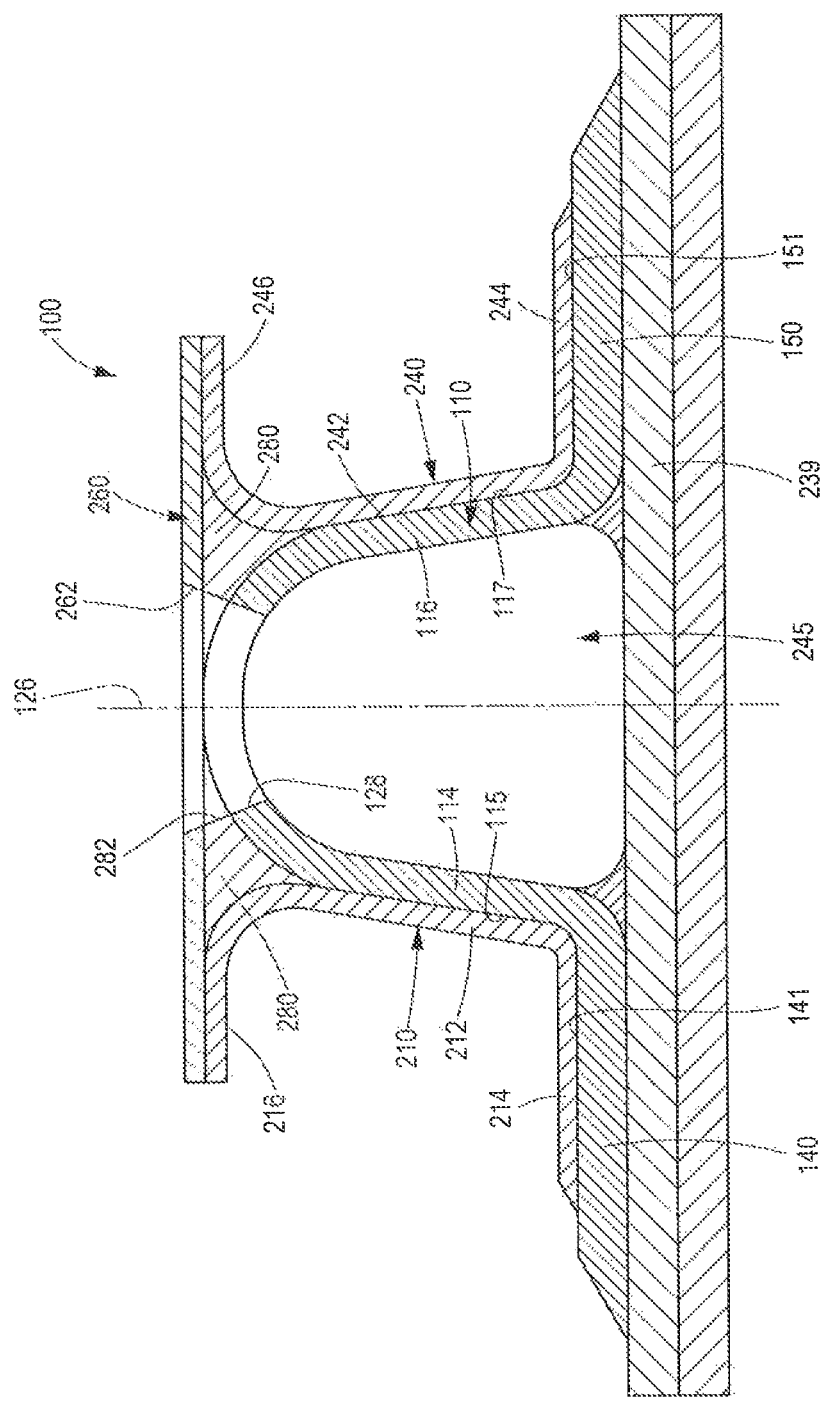
FIG. 6 is a schematic, elevation, sectional view of the hat stringer assembly of FIG. 1, including a hat-stringer base wall, according to one or more examples of the subject matter, disclosed herein.

In one or more examples, when viewed in side elevation, as best shown in FIGS. 5 and 6, forming, with a planar configuration, first-hat-stringer-leg surface 141, second-hat-stringer-leg surface 151, first-hat-stringer-sidewall surface 115, and second hat-stringer-sidewall surface 117, and forming, with an arcuate configuration, connecting wall 112, provides a curved wall stringer, having improved rigidity characteristics.

Figure 2:
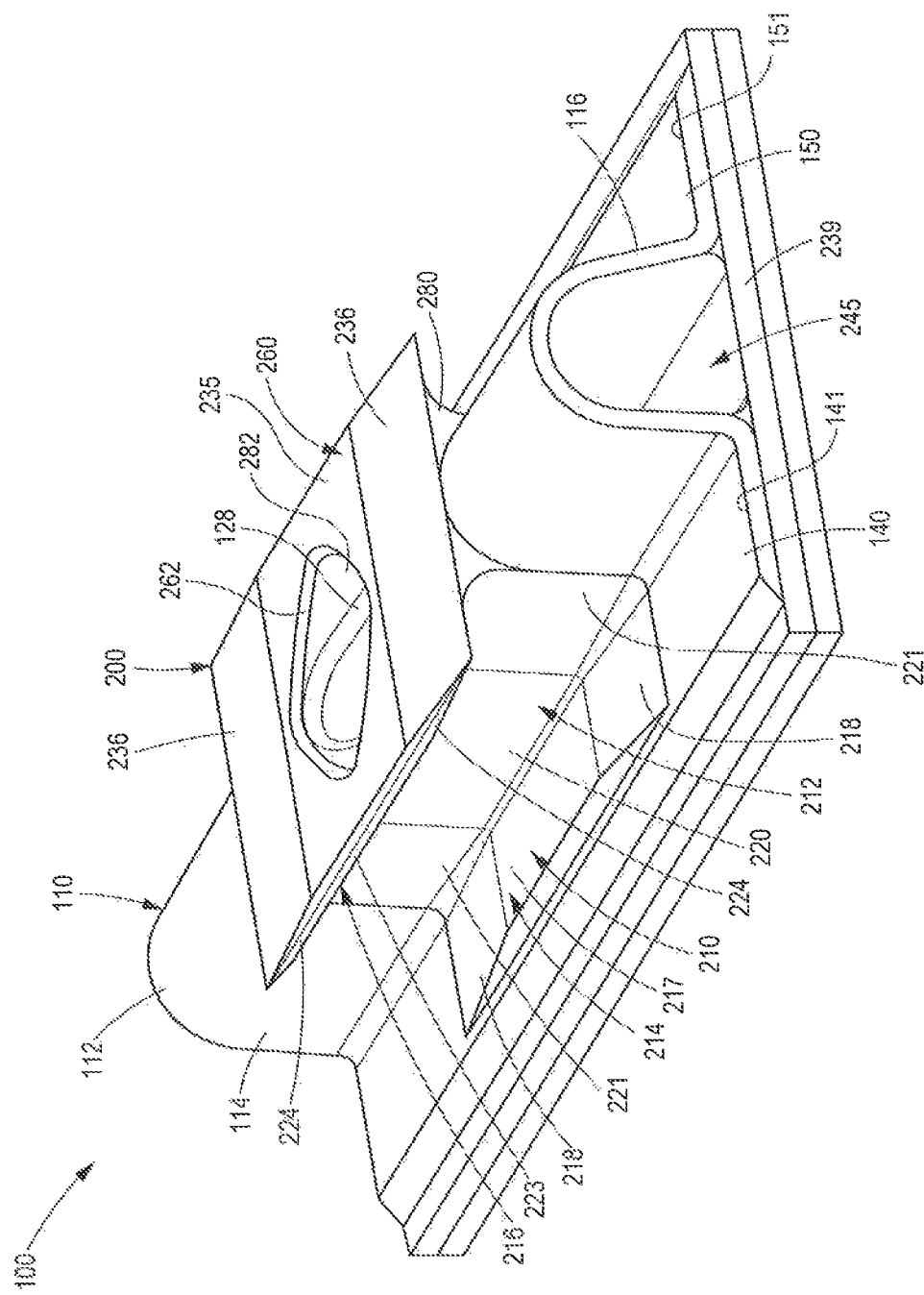
FIG. 2 is a schematic, perspective view of the hat stringer assembly of FIG. 1, including a hat-stringer base wall, according to one or more examples of the subject matter, disclosed herein.

Referring generally to FIG. 1 and particularly to, e.g., FIGS. 2 and 6 for illustrative purposes only and not by way of limitation, the following portion of this paragraph delineates example 3 of the subject matter, disclosed herein. According to example 3, which encompasses example 1 or 2, above, fitting 200 further comprises noodle 280, which is in contact with connecting wall 112 of hat stringer 110, first channel member 210, second channel member 240, and web cap 260 of fitting 200. Noodle 280 comprises noodle opening 282, which is in fluidic communication with web-cap opening 262 and with ventilation opening 128.

Providing noodle 280 further increases rigidity of hat stringer 110 surrounding ventilation opening 128. As used herein, a "noodle" is a filler structure, typically formed of a composite material. The noodle can be placed in an area or channel, extending along a length of a stringer or other type of elongate member, as is generally understood in the art.

Referring generally to FIG. 1 and particularly to, e.g., FIGS. 2-6 for illustrative purposes only and not by way of limitation, the following portion of this paragraph delineates example 4 of the subject matter, disclosed herein. According to example 4, which encompasses any one of examples 1 to 3, above, hat stringer 110 comprises a first plurality of plies of composite material, fitting 200 comprises a second plurality of plies of composite material, and fitting 200 is joined with hat stringer 110.

Forming hat stringer 110 from a first plurality of plies of composite material, fitting 200 from a second plurality of plies of composite material, and joining fitting 200 and hat stringer 110 streamlines and reduces costs associated with fabricating hat-stringer assembly 100, while improving rigidity of hat-stringer assembly 100.

In one or more examples, first hat-stringer leg 140, second hat-stringer leg 150, first hat-stringer sidewall 114, connecting wall 112, and second hat-stringer sidewall 116 are formed from the same plurality of plies of composite material, which are stacked on top of each other. In further examples, ventilation opening 128 is formed in each of the plurality of plies of composite material prior to stacking the plurality of plies of composite material on top of each other. In one or more examples, ventilation opening 128 is formed after the plurality of plies of composite material are stacked, such as by drilling or cutting through the stacked plurality of plies of composite material.

In one or more examples, first channel member 210, second channel member 240, and web cap 260 are formed from the same plurality of plies of composite material which are stacked on top of each other. In further examples, web-cap opening 262 is formed in a sub-set of the plurality of plies of composite material that forms web cap 260 prior to stacking the sub-set of the plurality of plies of composite material on top of each other. In one or more examples, web-cap opening 262 is formed after the sub-set of the plurality of plies of composite material that forms web cap 260 are stacked, such as by drilling or cutting through the stacked sub-set of the plurality of plies of composite material that forms web cap 260. In one or more examples, the sub-set of the plurality of plies of composite material that forms web cap 260 are positioned relative to the plurality of plies that form hat stringer 110 so that web-cap opening 262 is in fluidic communication with ventilation opening 128.

Referring generally to FIG. 1 and particularly to, e.g., FIGS. 2-6 for illustrative purposes only and not by way of limitation, the following portion of this paragraph delineates example 5 of the subject matter, disclosed herein. According to example 5, which encompasses example 4, above, fitting 200 is joined with hat stringer 110 by co-curing.

Joining fitting 200 to hat stringer 110 by co-curing improves rigidity of hat-stringer assembly 100 and eliminates the need to assemble, shim, seal, and fasten fitting 200 to hat stringer 110.

Referring generally to FIG. 1 and particularly to, e.g., FIGS. 2-6 for illustrative purposes only and not by way of limitation, the following portion of this paragraph delineates example 6 of the subject matter, disclosed herein. According to example 6, which encompasses example 4, above, fitting 200 is joined with hat stringer 110 by co-bonding.

Joining fitting 200 to hat stringer 110 by co-bonding improves rigidity of hat-stringer assembly 100 and eliminates the need to assemble, shim, seal, and fasten fitting 200 to hat stringer 110.

Referring generally to FIG. 1 and particularly to, e.g., FIGS. 8-11 for illustrative purposes only and not by way of limitation, the following portion of this paragraph delineates example 7 of the subject matter, disclosed herein. According to example 7, which encompasses any one of examples 1 to 6, above, ventilation opening 128 comprises circumferential edge 129, which is curvilinear in its entirety.

Providing ventilation opening 128 with circumferential edge 129 that is curvilinear in its entirety reduces stress levels around ventilation opening 128. Consequently, less material is required to maintain strains below a desired level, and therefore rigidity is maintained as thickness and stress concentrations are reduced.

Referring generally to FIG. 1 and particularly to, e.g., FIGS. 8-11 for illustrative purposes only and not by way of limitation, the following portion of this paragraph delineates example 8 of the subject matter, disclosed herein. According to example 8, which encompasses example 7, above, ventilation opening 128 defines ventilation-opening centroid 131, and circumferential edge 129 comprises plurality of first portions 300 that are concave when viewed from ventilation-opening centroid 131.

Providing circumferential edge 129 with plurality of first portions 300 that are concave when viewed from ventilation-opening centroid 131, enables ventilation opening 128 to more uniformly transition to web-cap opening 262.

Figure 8:
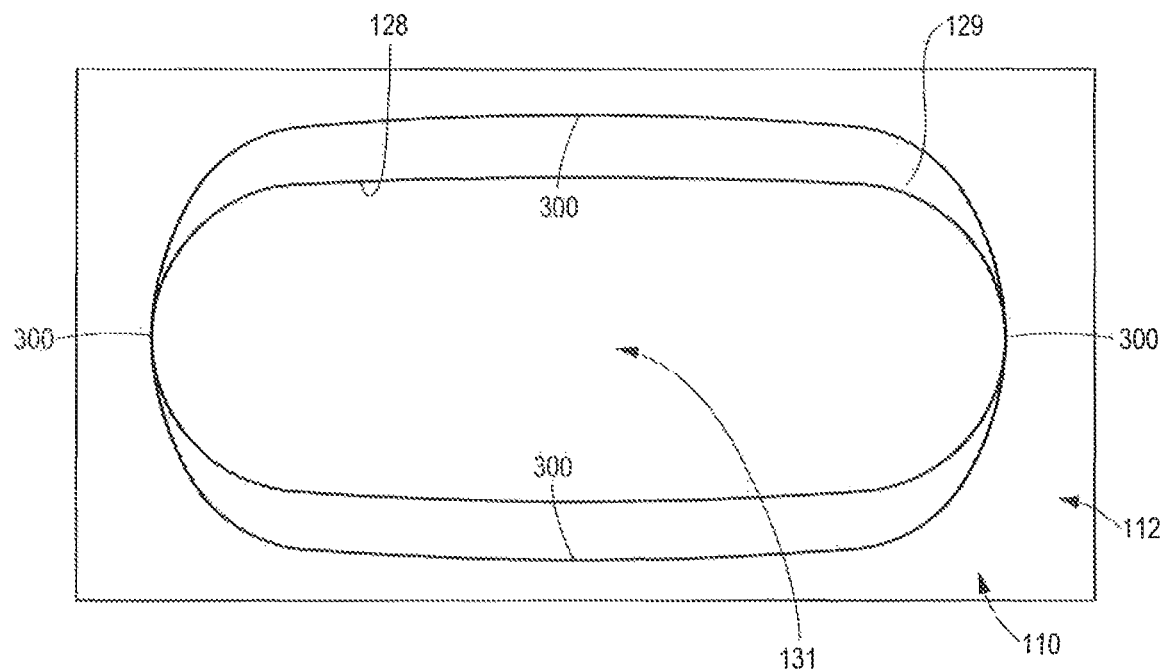
FIG. 8 is a schematic, top view of a ventilation opening of the hat stringer assembly of FIG. 1, according to one or more examples of the subject matter, disclosed herein.
Figure 9:
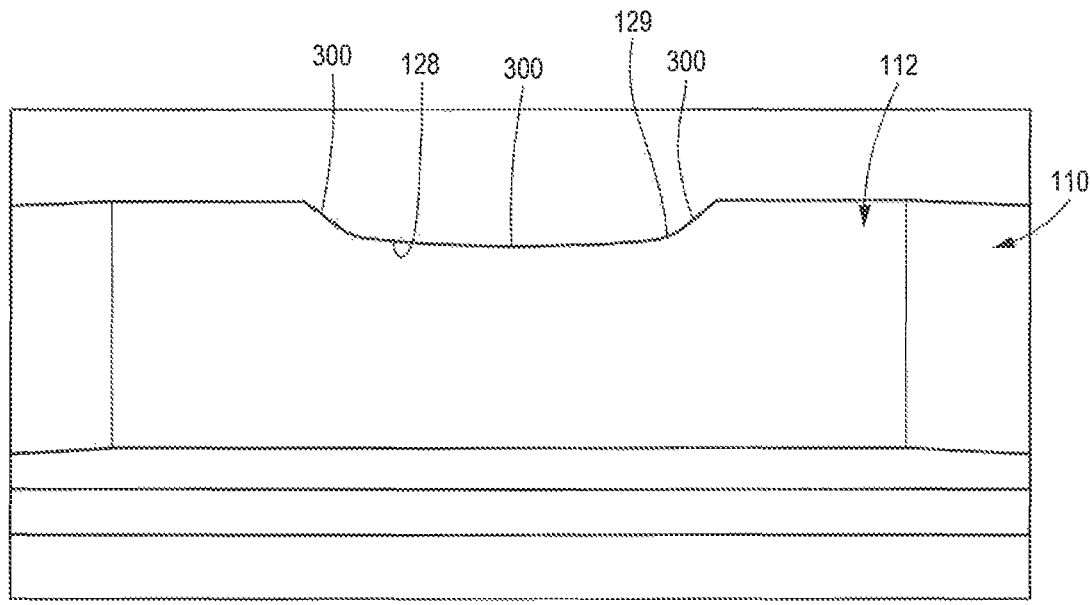
FIG. 9 is a schematic, elevation view of the ventilation opening of FIG. 8, according to one or more examples of the subject matter, disclosed herein.

Referring generally to FIG. 1 and particularly to, e.g., FIGS. 8 and 9 for illustrative purposes only and not by way of limitation, the following portion of this paragraph delineates example 9 of the subject matter, disclosed herein. According to example 9, which encompasses example 8, above, all portions of circumferential edge 129 comprise respective ones of plurality of first portions 300 that are concave when viewed from ventilation-opening centroid 131.

Providing all portions of circumferential edge 129 as first portions 300 that are concave when viewed from ventilation-opening centroid 131 reduces stress concentrations in hat stringer 110 near ventilation opening 128.

Referring generally to FIG. 1 and particularly to, e.g., FIGS. 8 and 9 for illustrative purposes only and not by way of limitation, the following portion of this paragraph delineates example 10 of the subject matter, disclosed herein. According to example 10, which encompasses example 9, above, circumferential edge 129 has an elliptical shape.

Providing circumferential edge 129 with an elliptical shape facilitates fabrication and measurement to ensure sufficient sizing of ventilation opening 128.

Figure 7:
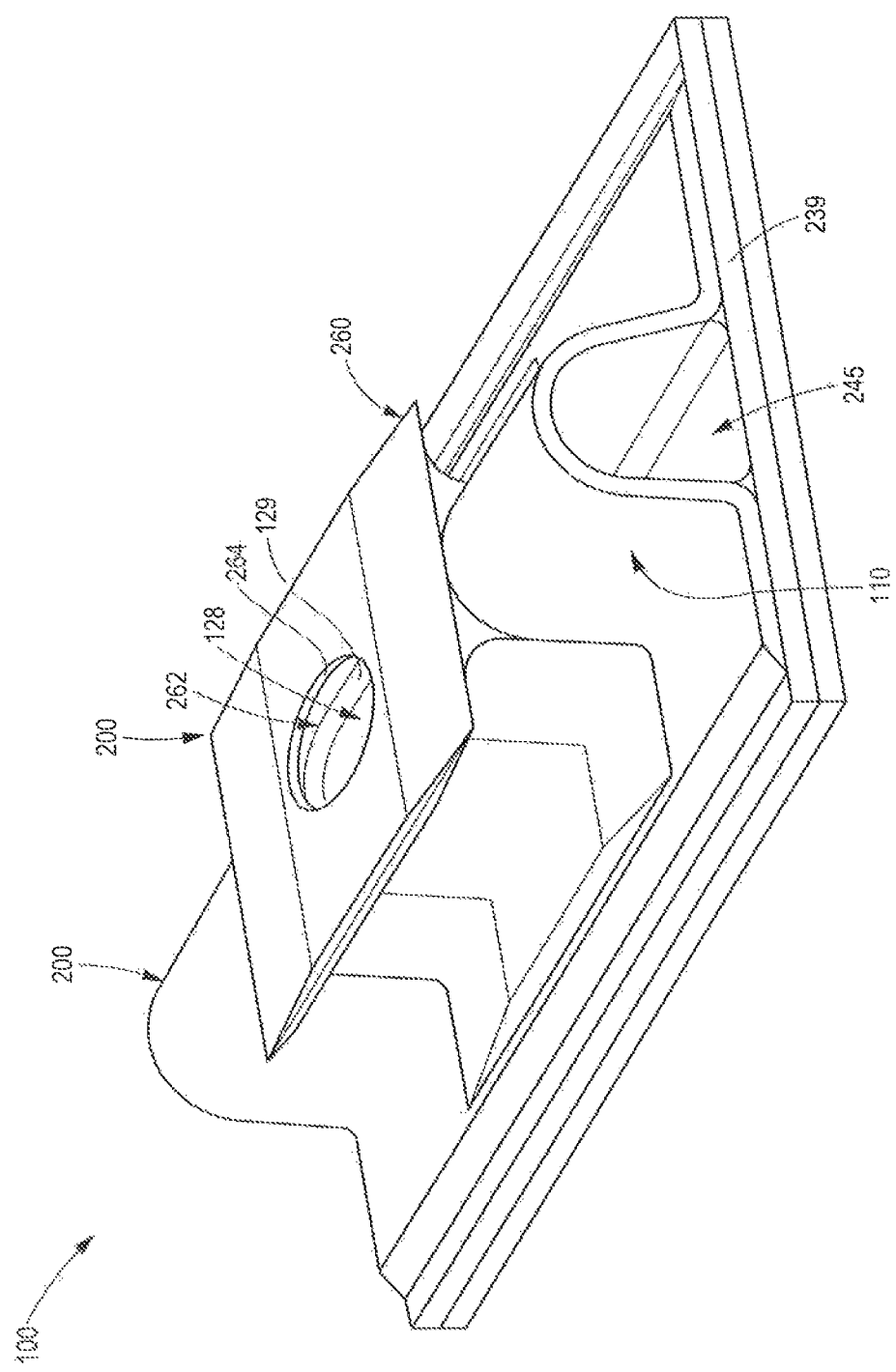
FIG. 7 is a schematic, perspective view of the hat stringer assembly of FIG. 1, according to one or more examples of the subject matter, disclosed herein.

Referring generally to FIG. 1 and particularly to, e.g., FIG. 7 for illustrative purposes only and not by way of limitation, the following portion of this paragraph delineates example 11 of the subject matter, disclosed herein. According to example 11, which encompasses example 10, above, web-cap opening 262 has web-cap-opening circumferential edge 264, and web-cap-opening circumferential edge 264 has an elliptical shape.

Providing web-cap-opening circumferential edge 264 with an elliptical shape provides a smoother transition and fluid flow when circumferential edge 129 of ventilation opening 128 also has an elliptical shape.

Referring generally to FIG. 1 and particularly to, e.g., FIG. 7 for illustrative purposes only and not by way of limitation, the following portion of this paragraph delineates example 12 of the subject matter, disclosed herein. According to example 12, which encompasses example 11, above, ventilation opening 128 has a ventilation-opening area, web-cap opening 262 has a web-cap-opening area, and the ventilation-opening area is less than the web-cap-opening area.

Providing ventilation opening 128 with the ventilation-opening area that is less than the web-cap-opening area promotes a more laminar flow through ventilation opening 128 and web-cap opening 262.

Figure 3:
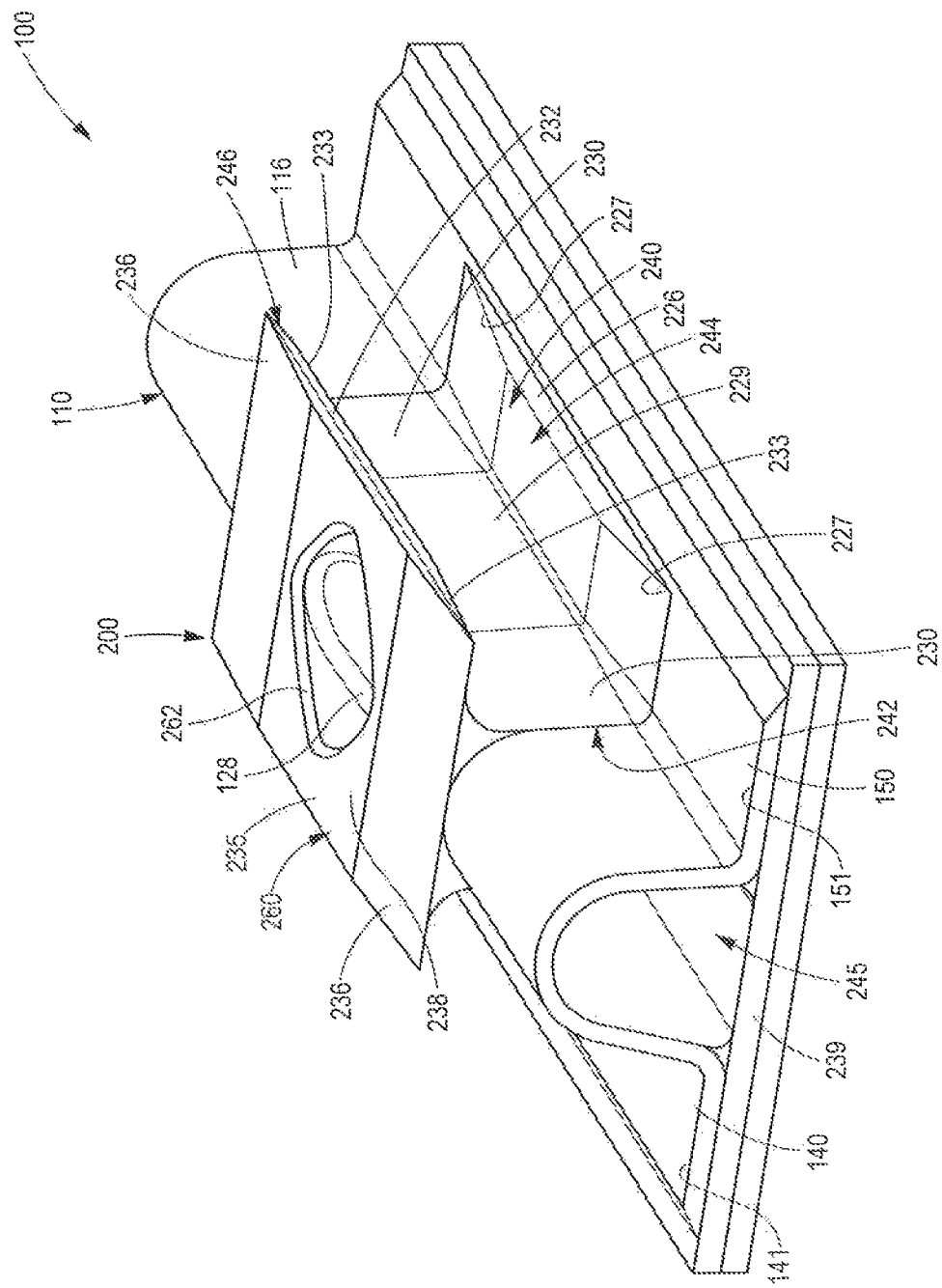
FIG. 3 is a schematic, perspective, view of the hat stringer assembly of FIG. 1, including a hat-stringer base wall, according to one or more examples of the subject matter, disclosed herein.
Figure 4:
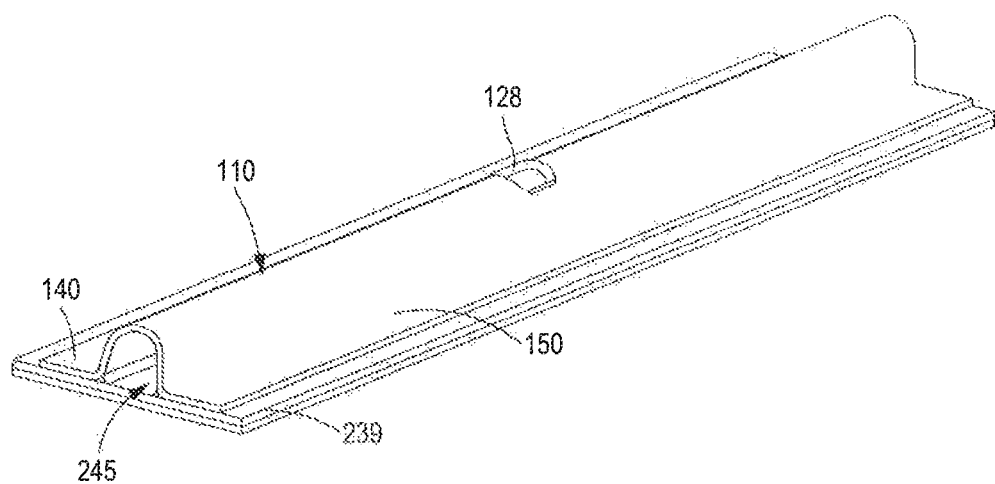
FIG. 4 is a schematic, perspective, view of a hat stringer provided in the hat stringer assembly of FIG. 1, including a hat-stringer base wall, according to one or more examples of the subject matter, disclosed herein.

Referring generally to FIG. 1 and particularly to, e.g., FIGS. 2 and 3 for illustrative purposes only and not by way of limitation, the following portion of this paragraph delineates example 13 of the subject matter, disclosed herein. According to example 13, which encompasses example 10, above, web-cap opening 262 has web-cap-opening circumferential edge 264, and web-cap-opening circumferential edge 264 is shaped as a quadrilateral, having sides, interconnected by curved lines.

Providing web-cap-opening circumferential edge 264 shaped as a quadrilateral, having sides, interconnected by curved lines, enables hat-stringer assembly 100 to better interface with ancillary components attached to hat-stringer assembly 100.

Referring generally to FIG. 1 and particularly to, e.g., FIGS. 2 and 3 for illustrative purposes only and not by way of limitation, the following portion of this paragraph delineates example 14 of the subject matter, disclosed herein. According to example 14, which encompasses example 13, above, ventilation opening 128 has a ventilation-opening area, web-cap opening 262 has a web-cap-opening area, and the ventilation-opening area is less than the web-cap-opening area.

Providing ventilation opening 128 with the ventilation-opening area that is less than the web-cap-opening area reduces the pressure drop of the fluid, flowing from ventilation opening 128 to web-cap opening 262.

Figure 10:
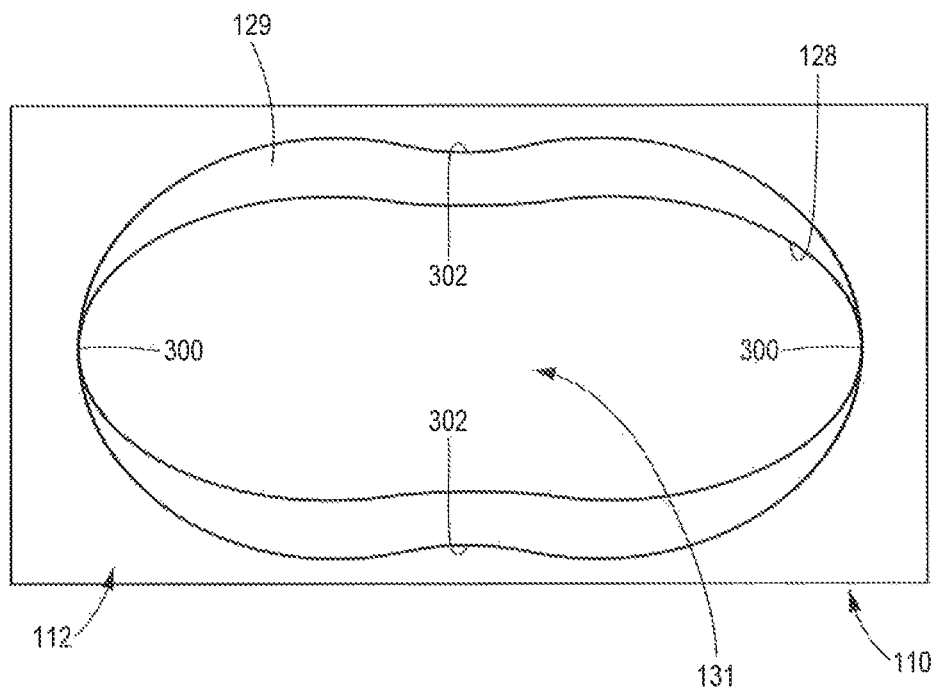
FIG. 10 is a schematic, top view of a ventilation opening of the hat stringer assembly of FIG. 1, according to one or more examples of the subject matter, disclosed herein.
Figure 11:
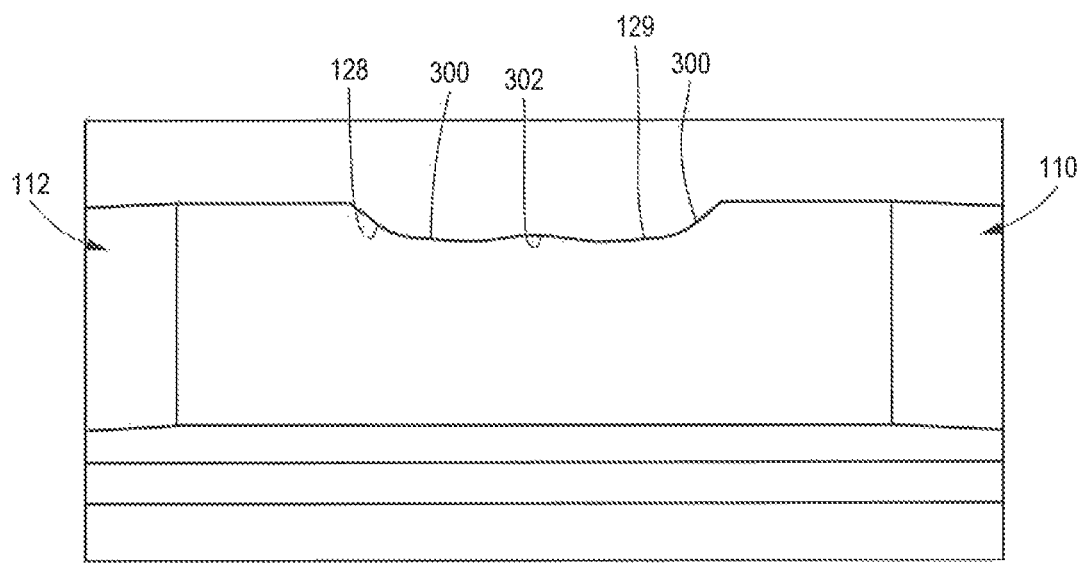
FIG. 11 is a schematic, elevation view of the ventilation opening of FIG. 10, according to one or more examples of the subject matter, disclosed herein.

Referring generally to FIG. 1 and particularly to, e.g., FIGS. 10 and 11 for illustrative purposes only and not by way of limitation, the following portion of this paragraph delineates example 15 of the subject matter, disclosed herein. According to example 15, which encompasses example 8, above, circumferential edge 129 further comprises second portion 302 that is convex when viewed from ventilation-opening centroid 131.

Providing circumferential edge 129 with both first portions 300 that are concave and second portions 302 that are convex, when viewed from ventilation-opening centroid 131 enables additional mass from hat stringer 110 to be redistributed around ventilation opening 128, such that rigidity of hat stringer 110 around ventilation opening 128 is increased.

Referring generally to FIG. 1 and particularly to, e.g., FIGS. 10 and 11 for illustrative purposes only and not by way of limitation, the following portion of this paragraph delineates example 16 of the subject matter, disclosed herein. According to example 16, which encompasses example 15, above, two first portions 300 of plurality of first portions 300 that are concave when viewed from ventilation-opening centroid 131 are joined together by second portion 302 that is convex when viewed from ventilation-opening centroid 131.

Providing circumferential edge 129 with two first portions 300 that are concave joined together by second portion 302 that is convex, increases the hydraulic area of ventilation opening 128, thereby reducing the pressure drop of fluid flowing therethrough.

Referring generally to FIG. 1 and particularly to, e.g., FIGS. 2 and 3 for illustrative purposes only and not by way of limitation, the following portion of this paragraph delineates example 17 of the subject matter, disclosed herein. According to example 17, which encompasses any one of examples 1 to 16, above, first-channel-member base leg 214 comprises first-channel-member-base-leg central portion 217 and two first-channel-member-base-leg tapered portions 218, extending from first-channel-member-base-leg central portion 217 in opposite directions. First-channel-member-base-leg central portion 217 has a uniform thickness.

Providing first-channel-member base leg 214 with first-channel-member-base-leg central portion 217 having uniform thickness and two first-channel-member-base-leg tapered portions 218 of non-uniform thickness reduces bow waves and resin richness during the composite fabrication process Referring generally to FIG. 1 and particularly to, e.g., FIG. 2 for illustrative purposes only and not by way of limitation, the following portion of this paragraph delineates example 18 of the subject matter, disclosed herein. According to example 18, which encompasses example 17, above, first-channel-member sidewall 212 comprises first-channel-member-sidewall central portion 220 and two first-channel-member-sidewall tapered portions 221, extending from first-channel-member-sidewall central portion 220 in opposite directions. First-channel-member-sidewall central portion 220 has a uniform thickness.

Providing first-channel-member sidewall 212 with first-channel-member-sidewall central portion 220, having a uniform thickness, and two first-channel-member-sidewall tapered portions 221 of non-uniform thickness reduces bow waves and resin richness during the composite fabrication process.

Referring generally to FIG. 1 and particularly to, e.g., FIG. 2 for illustrative purposes only and not by way of limitation, the following portion of this paragraph delineates example 19 of the subject matter, disclosed herein. According to example 19, which encompasses example 18, above, first-channel-member cap leg 216 comprises first-channel-member-cap-leg central portion 223 and two first-channel-member-cap-leg tapered portions 224, extending from first-channel-member-cap-leg central portion 223 in opposite directions. First-channel-member-cap-leg central portion 223 has a uniform thickness.

Providing first-channel-member cap leg 216 with first-channel-member-cap-leg central portion 223 having uniform thickness and two first-channel-member-cap-leg tapered portions 224 of non-uniform thickness provides a more distributed load path for local out-of-plane loads.

Referring generally to FIG. 1 and particularly to, e.g., FIG. 3 for illustrative purposes only and not by way of limitation, the following portion of this paragraph delineates example 20 of the subject matter, disclosed herein. According to example 20, which encompasses example 19, above, second-channel-member base leg 244 comprises second-channel-member-base-leg central portion 226 and two second-channel-member-base-leg tapered portions 227, extending from second-channel-member-base-leg central portion 226 in opposite directions. Second-channel-member-base-leg central portion 226 has a uniform thickness.

Providing second-channel-member base leg 244 with second-channel-member-base-leg central portion 226, having a uniform thickness, and two second-channel-member-base-leg tapered portions 227 of non-uniform thickness provides a more distributed load path for local out-of-plane loads.

Referring generally to FIG. 1 and particularly to, e.g., FIG. 3 for illustrative purposes only and not by way of limitation, the following portion of this paragraph delineates example 21 of the subject matter, disclosed herein. According to example 21, which encompasses example 20, above, second-channel-member sidewall 242 comprises second-channel-member-sidewall central portion 229 and two second-channel-member-sidewall tapered portions 230, extending from second-channel-member-sidewall central portion 229 in opposite directions. Second-channel-member-sidewall central portion 229 has a uniform thickness.

Providing second-channel-member sidewall 242 with second-channel-member-sidewall central portion 229, having a uniform thickness, and two second-channel-member-sidewall tapered portions 230 of non-uniform thickness reduces stress concentrations between second-channel-member sidewall 242 and second hat-stringer sidewall 116, while reducing weight of second-channel-member sidewall 242.

Referring generally to FIG. 1 and particularly to, e.g., FIG. 3 for illustrative purposes only and not by way of limitation, the following portion of this paragraph delineates example 22 of the subject matter, disclosed herein. According to example 22, which encompasses example 21, above, second-channel-member cap leg 246 comprises second-channel-member-cap-leg central portion 232 and two second-channel-member-cap-leg tapered portions 233, extending from second-channel-member-cap-leg central portion 232 in opposite directions. Second-channel-member-cap-leg central portion 232 has a uniform thickness.

Providing second-channel-member cap leg 246 with second-channel-member-cap-leg central portion 232, having a uniform thickness, and two second-channel-member-cap-leg tapered portions 233 of non-uniform thickness reduces stress concentrations between second-channel-member cap leg 246 and web cap 260, while reducing weight of second-channel-member cap leg 246.

Referring generally to FIG. 1 and particularly to, e.g., FIGS. 2 and 3 for illustrative purposes only and not by way of limitation, the following portion of this paragraph delineates example 23 of the subject matter, disclosed herein. According to example 23, which encompasses example 22, above, web cap 260 comprises web-cap central portion 235 and two web-cap tapered portions 236, extending from web-cap central portion 235 in opposite directions. Web-cap central portion 235 defines web-cap opening 262, which is in fluidic communication with ventilation opening 128. Web-cap central portion 235 has a uniform thickness.

Providing web cap 260 with web-cap central portion 235, having a uniform thickness, and two web-cap tapered portions 236 of non-uniform thickness reduces stress concentrations between web cap 260 and first channel member 210 and between web cap 260 and second channel member 240, while reducing weight of web cap 260.

Referring generally to FIG. 1 and particularly to, e.g., FIGS. 2 and 3 for illustrative purposes only and not by way of limitation, the following portion of this paragraph delineates example 24 of the subject matter, disclosed herein. According to example 24, which encompasses example 23, above, web-cap central portion 235 comprises web-cap-central-portion planar surface 238.

Providing web-cap central portion 235 with web-cap-central-portion planar surface 238 facilitates placement, fastening, and sealing of an ancillary component, such as a vent valve, to hat-stringer assembly 100.

Referring generally to FIG. 1 and particularly to, e.g., FIGS. 2-6 for illustrative purposes only and not by way of limitation, the following portion of this paragraph delineates example 25 of the subject matter, disclosed herein. According to example 25, which encompasses any one of examples 1 to 24, above, hat stringer 110 further comprises hat-stringer base wall 239, coupled to first hat-stringer leg 140 and to second hat-stringer leg 150.

Providing hat-stringer base wall 239 coupled to first hat-stringer leg 140 and to second hat-stringer leg 150 facilitates fabrication of hat-stringer assembly 100 as a unitary component, having improved rigidity, prior to installation on a primary structure, such as an aircraft.

Referring generally to FIG. 1 and particularly to, e.g., FIGS. 2-6 for illustrative purposes only and not by way of limitation, the following portion of this paragraph delineates example 26 of the subject matter, disclosed herein. According to example 26, which encompasses example 25, above, hat-stringer base wall 239 extends from first hat-stringer leg 140 to second hat-stringer leg 150.

By extending from first hat-stringer leg 140 to second hat-stringer leg 150, hat-stringer base wall 239 further increases the rigidity of hat-stringer assembly 100 when formed as a unitary component, prior to installation on a primary structure.

Referring generally to FIG. 1 and particularly to, e.g., FIGS. 2-6 for illustrative purposes only and not by way of limitation, the following portion of this paragraph delineates example 27 of the subject matter, disclosed herein. According to example 27, which encompasses example 26, above, hat-stringer assembly 100 further comprises hat-stringer cavity 245, which is in fluidic communication with ventilation opening 128. First hat-stringer sidewall 114, connecting wall 112, second hat-stringer sidewall 116, and a portion of hat-stringer base wall 239 form at least a portion of hat-stringer cavity 245.

Providing hat-stringer cavity 245 expands the functionality of hat-stringer assembly 100 to enable fluid flow therethrough. For example, when hat-stringer assembly 100 is located in a wing of an aircraft, hat-stringer cavity 245 enables air to be communicated from the outside environment into the fuel tank provided in the wing.

Referring generally to FIG. 12 and particularly to, e.g., FIGS. 1-6 for illustrative purposes only and not by way of limitation, the following portion of this paragraph delineates example 28 of the subject matter, disclosed herein. According to example 28, method 400 of forming hat-stringer assembly 100 of any one of examples 1 to 27, above, comprises steps of (block 402) forming hat stringer 110 from a first plurality of plies of composite material, (block 404) forming fitting 200 from a second plurality of plies of composite material, and (block 406) joining hat stringer 110 and fitting 200 together.

Forming hat stringer 110 from a first plurality of plies of composite material and forming fitting 200 from a second plurality of plies of composite material enables fabrication of both components using the same manufacturing techniques, thereby reducing fabrication time and expense. Joining hat stringer 110 and fitting 200, such as by co-curing or co-bonding, results in hat-stringer assembly 100 having improved integrity and rigidity, while reducing overall weight associated with fastening separate components together and/or associated with heavier materials used in conventional fittings.

Referring generally to FIG. 12 and particularly to, e.g., FIGS. 1-6 for illustrative purposes only and not by way of limitation, the following portion of this paragraph delineates example 29 of the subject matter, disclosed herein. According to example 29, which encompasses example 28, above, method 400 further comprises, after the step of (block 406) joining hat stringer 110 and fitting 200 together, (block 408) machining at least one of an exterior surface of hat stringer 110 or an exterior surface of fitting 200.

Machining exterior surface of hat stringer 110 or exterior surface of fitting 200 after joining enables hat-stringer assembly 100 to meet tight tolerances needed to interface with ancillary components or to meet space requirements.

Referring generally to FIG. 1 and particularly to, e.g., FIGS. 2-6 and 13 for illustrative purposes only and not by way of limitation, the following portion of this paragraph delineates example 30 of the subject matter, disclosed herein. According to example 30, aircraft 500 comprises skin portion 502, comprising inner side 504. Aircraft 500 also comprises hat-stringer assembly 100 according to any one of examples 1 to 27, above. Hat-stringer assembly 100 is coupled to inner side 504 of skin portion 502.

Hat-stringer assembly 100 provides advantages when used on aircraft 500. Hat stringer 110 reinforces skin portion 502 of aircraft 500, allowing skin portion 502 to be made from a thinner material and reducing overall weight of aircraft 500. Additionally, providing hat-stringer assembly 100 that comprises both hat stringer 110 and fitting 200 eliminates the need to assemble a separate, metallic fitting onto an existing hat stringer, which would require the separate fitting to be positioned on the stringer, adjusted and or shimmed relative to the stringer, and sealed to the stringer. Still further, fitting 200 is configured to strengthen a portion of hat stringer 110 near ventilation opening 128, thereby increasing local stiffness of hat stringer 110 while reducing weight. Fitting 200 comprises first channel member 210 and second channel member 240 having portions that are coupled to hat stringer 110, thereby to reinforce hat stringer 110. Specifically, first channel member 210 has first-channel-member sidewall 212, in contact with first hat-stringer sidewall 114, and first-channel-member base leg 214, extending from first-channel-member sidewall 212 and in contact with first hat-stringer leg 140. Second channel member 240 comprises second-channel-member sidewall 242, in contact with second hat-stringer sidewall 116, and second-channel-member base leg 244, extending from second-channel-member sidewall 242 and in contact with second hat-stringer leg 150. Additionally, first channel member 210 comprises first-channel-member cap leg 216, extending from first-channel-member sidewall 212, while second channel member 240 comprises second-channel-member cap leg 246, extending from second-channel-member sidewall 242. Web cap 260 is in contact with first-channel-member cap leg 216 and second-channel-member cap leg 246 and extends over ventilation opening 128, to provide additional reinforcement to the stringer near ventilation opening 128, while providing a structure for receiving and supporting ancillary components, such as a vent valve.

Figure 14:
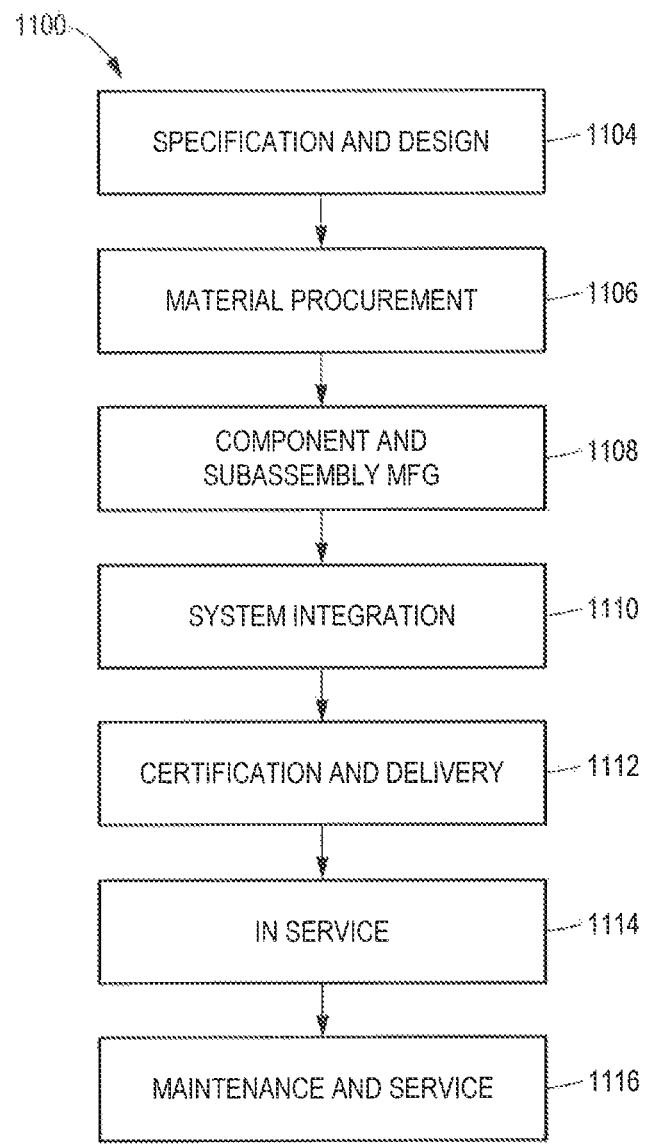
FIG. 14 is a block diagram of aircraft production and service methodology.
Figure 15:
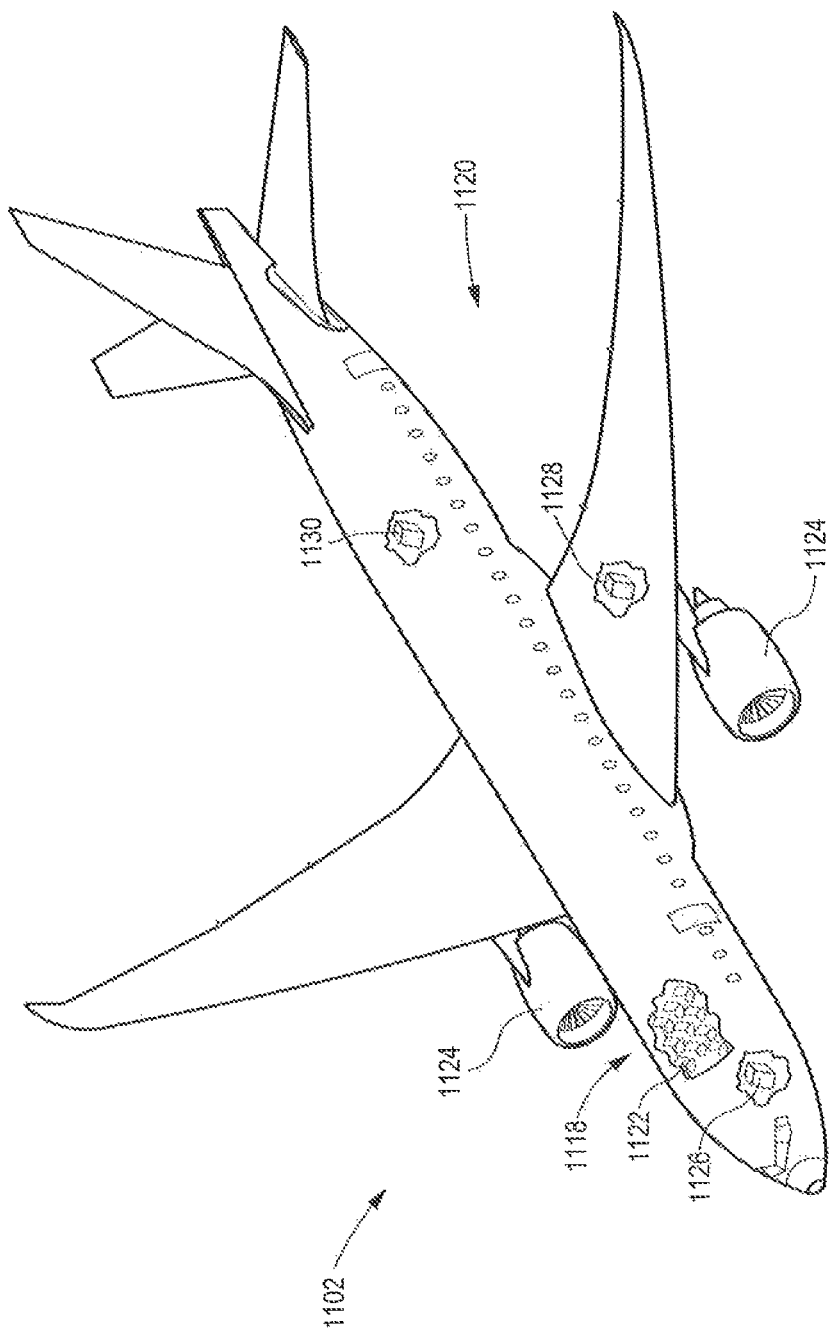
FIG. 15 is a schematic illustration of an aircraft.

Examples of the subject matter, disclosed herein may be described in the context of aircraft manufacturing and service method 1100 as shown in FIG. 14 and aircraft 1102 as shown in FIG. 15. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 15, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus (es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus (es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. A hat-stringer assembly (100) for an aircraft (500), the hat-stringer assembly (100) comprising:
a hat stringer (110) comprising:
a first hat-stringer leg (140) having a first-hat-stringer-leg surface (141);
a second hat-stringer leg (150) having a second-hat-stringer-leg surface (151), wherein the second hat-stringer leg (150) is spaced apart from the first hat-stringer leg (140);

a first hat-stringer sidewall (114) having a first-hat-stringer-sidewall surface (115) extending from the first-hat-stringer-leg surface (141);

a connecting wall (112) extending from the first hat-stringer sidewall (114) and having a virtual connecting-wall symmetry plane (126) passing through the connecting wall (112);

a second hat-stringer sidewall (116) having a second-hat-stringer-sidewall surface (117) extending from the connecting wall (112) to the second-hat-stringer-leg surface (151); and a ventilation opening (128) extending through the connecting wall (112); and a fitting (200) coupled to the hat stringer (110) and the fitting comprising:

a first channel member (210) comprising:
a first-channel-member sidewall (212) in contact with the first hat-stringer sidewall (114);
a first-channel-member base leg (214) extending from the first-channel-member sidewall (212) and in contact with the first hat-stringer leg (140); and
a first-channel-member cap leg (216) extending from the first-channel-member sidewall (212);

a second channel member (240) comprising:
a second-channel-member sidewall (242) in contact with the second hat-stringer sidewall (116);
a second-channel-member base leg (244) extending from the second-channel-member sidewall (242) and in contact with the second hat-stringer leg (150); and
a second-channel-member cap leg (246) extending from the second-channel-member sidewall (242);

a web cap (260) in contact with the first-channel-member cap leg (216) and the second-channel-member cap leg (246), wherein the web cap (260) comprises a web-cap opening (262) in fluid communication with the ventilation opening (128); and a noodle (280) in contact with the connecting wall (112) of the hat stringer (110), the first channel member (210), the second channel member (240), and the web cap (260) of the fitting (200).

2. The hat-stringer assembly (100) according to claim 1, wherein:
the first-hat-stringer-leg surface (141) is planar;
the second-hat-stringer-leg surface (151) is planar;
the first-hat-stringer-leg surface (141) and the second-hat-stringer-leg surface (151) are co-planar;
the first-hat-stringer-sidewall surface (115) is planar;
the first-hat-stringer-sidewall surface (115) is oblique to or perpendicular to the first-hat-stringer-leg surface (141);
the connecting wall (112) is arcuate;
the virtual connecting-wall symmetry plane (126) is perpendicular to the first-hat-stringer-leg surface (141) and the second-hat-stringer-leg surface (151);
the second-hat-stringer-sidewall surface (117) is planar; and
the second-hat-stringer-sidewall surface (117) is oblique to or perpendicular to the second-hat-stringer-leg surface (151).

3. The hat-stringer assembly (100) according to claim 1, wherein:
the noodle (280) comprises a noodle opening (282) in fluid communication with the web-cap opening (262) and with the ventilation opening (128).

4. The hat-stringer assembly (100) according to claim 1, wherein:
the hat stringer (110) comprises a first plurality of plies of composite material;
the fitting (200) comprises a second plurality of plies of composite material; and
the fitting (200) is joined with the hat stringer (110).

5. The hat-stringer assembly (100) according to claim 4, wherein the fitting (200) is joined with the hat stringer (110) by co-curing.

6. The hat-stringer assembly (100) according to claim 4, wherein the fitting (200) is joined with the hat stringer (110) by co-bonding.

7. The hat-stringer assembly (100) according to claim 1, wherein:
the ventilation opening (128) comprises a circumferential edge (129); and
the circumferential edge (129) is curvilinear in its entirety.

8. The hat-stringer assembly (100) according to claim 7, wherein:
the ventilation opening (128) defines a ventilation-opening centroid (131); and
the circumferential edge (129) comprises a plurality of first portions (300) that are concave when viewed from the ventilation-opening centroid (131).

9. The hat-stringer assembly (100) according to claim 8, wherein all portions of the circumferential edge (129) comprise respective ones of the plurality of first portions (300) that are concave when viewed from the ventilation-opening centroid (131).

10. The hat-stringer assembly (100) according to claim 9, wherein the circumferential edge (129) has an elliptical shape.

11. The hat-stringer assembly (100) according to claim 10, wherein:
the web-cap opening (262) has a web-cap-opening circumferential edge (264); and
the web-cap-opening circumferential edge (264) has an elliptical shape.

12. The hat-stringer assembly (100) according to claim 11, wherein:
the ventilation opening (128) has a ventilation-opening area;
the web-cap opening (262) has a web-cap-opening area; and
the ventilation-opening area is less than the web-cap-opening area.

13. The hat-stringer assembly (100) according to claim 8, wherein the circumferential edge (129) further comprises a second portion (302) that is convex when viewed from the ventilation-opening centroid (131).

14. The hat-stringer assembly (100) according to claim 13, wherein two first portions (300) of the plurality of first portions (300) that are concave when viewed from the ventilation-opening centroid (131) are joined together by the second portion (302) that is convex when viewed from the ventilation-opening centroid (131).

15. The hat-stringer assembly (100) according to claim 1, wherein:
the first-channel-member base leg (214) comprises a first-channel-member-base-leg central portion (217) and two first-channel-member-base-leg tapered portions (218) extending from the first-channel-member-base-leg central portion (217) in opposite directions; and
the first-channel-member-base-leg central portion (217) has a uniform thickness.

16. The hat-stringer assembly (100) according to claim 15, wherein:
the first-channel-member sidewall (212) comprises a first-channel-member-sidewall central portion (220) and two first-channel-member-sidewall tapered portions (221) extending from the first-channel-member-sidewall central portion (220) in opposite directions; and
the first-channel-member-sidewall central portion (220) has a uniform thickness.

17. The hat-stringer assembly (100) according to claim 16, wherein:
the first-channel-member cap leg (216) comprises a first-channel-member-cap-leg central portion (223) and two first-channel-member-cap-leg tapered portions (224) extending from the first-channel-member-cap-leg central portion (223) in opposite directions; and
the first-channel-member-cap-leg central portion (223) has a uniform thickness.

18. The hat-stringer assembly (100) according to claim 17, wherein:
the second-channel-member base leg (244) comprises a second-channel-member-base-leg central portion (226) and two second-channel-member-base-leg tapered portions (227) extending from the second-channel-member-base-leg central portion (226) in opposite directions; and
the second-channel-member-base-leg central portion (226) has a uniform thickness.

19. A method (400) of forming the hat-stringer assembly (100) according to claim 1, the method comprising steps of:
forming the hat stringer (110) from a first plurality of plies of composite material;
forming the fitting (200) from a second plurality of plies of composite material; and
joining the hat stringer (110) and the fitting (200) together.

20. An aircraft (500), comprising:
a skin portion (502), comprising an inner side (504);
a hat-stringer assembly (100) coupled to the inner side (504) of the skin portion (502);
wherein the hat-stringer assembly (100) comprises:
a hat stringer (110) comprising:
a first hat-stringer leg (140) having a first-hat-stringer-leg surface (141);
a second hat-stringer leg (150) having a second-hat-stringer-leg surface (151), wherein the second hat-stringer leg (150) is spaced apart from the first hat-stringer leg (140);
a first hat-stringer sidewall (114) having a first-hat-stringer-sidewall surface (115) extending from the first-hat-stringer-leg surface (141);
a connecting wall (112) extending from the first hat-stringer sidewall (114) and having a virtual connecting-wall symmetry plane (126) passing through the connecting wall (112);
a second hat-stringer sidewall (116) having a second-hat-stringer-sidewall surface (117) extending from the connecting wall (112) to the second-hat-stringer-leg surface (151); and
a ventilation opening (128) extending through the connecting wall (112); and
a fitting (200) coupled to the hat stringer (110) and the fitting comprising:
a first channel member (210) comprising:
a first-channel-member sidewall (212) in contact with the first hat-stringer sidewall (114);
a first-channel-member base leg (214) extending from the first-channel-member sidewall (212) and in contact with the first hat-stringer leg (140), wherein the first-channel-member base leg (214) comprises a first-channel-member-base-leg central portion (217) and two first-channel-member-base-leg tapered portions (218) extending from the first-channel-member-base-leg central portion (217) in opposite directions; and
a first-channel-member cap leg (216) extending from the first-channel-member sidewall (212);
a second channel member (240) comprising:
a second-channel-member sidewall (242) in contact with the second hat-stringer sidewall (116);
a second-channel-member base leg (244) extending from the second-channel-member sidewall (242) and in contact with the second hat-stringer leg (150); and
a second-channel-member cap leg (246) extending from the second-channel-member sidewall (242); and
a web cap (260) in contact with the first-channel-member cap leg (216) and the second-channel-member cap leg (246), wherein the web cap (260) comprises a web-cap opening (262) in fluid communication with the ventilation opening (128).

* * * * *